United States Patent [19]

Vandenbrink et al.

[11] 4,166,651
[45] Sep. 4, 1979

[54] VEHICULAR MIRROR ASSEMBLY AND PIVOT SUPPORT ASSEMBLY THEREFOR

[75] Inventors: Wayne Vandenbrink; Philip D. Stegenga, both of West Olive; Richard D. Hutchinson, Jr., Holland, all of Mich.

[73] Assignee: Donnelly Mirrors, Inc., Holland, Mich.

[21] Appl. No.: 822,085

[22] Filed: Aug. 5, 1977

[51] Int. Cl.[2] .............................................. A47G 1/24
[52] U.S. Cl. .................................. 296/84 B; 248/487
[58] Field of Search ............ 296/84 B; 248/487, 403, 248/68, 70, 71, 289 R, 291, 145

[56] References Cited

U.S. PATENT DOCUMENTS

| | | | |
|---|---|---|---|
| 311,731 | 2/1885 | Ege | |
| 775,003 | 11/1904 | Eustis | 296/84 B |
| 1,558,641 | 10/1925 | Short | 296/84 B |
| 2,565,012 | 8/1951 | Barrett | 248/296 |
| 2,696,964 | 12/1954 | Ringwald | 248/288 |
| 2,969,715 | 1/1961 | Mosby | 88/98 |
| 3,098,273 | 7/1963 | Cochran | 248/71 |
| 3,189,309 | 6/1965 | Hager | 248/279 |
| 3,667,718 | 6/1972 | Goslin | 248/487 |
| 3,833,198 | 9/1974 | Holzman | 248/476 |
| 3,981,474 | 9/1976 | Szilagi | 248/487 |

*Primary Examiner*—Philip Goodman

[57] ABSTRACT

This specification discloses a vehicular mirror assembly adapted for exterior use on vehicles and is corrosion resistant, has low vibration, resists unintentional adjustment and may be adjusted when desired to a full range of positions. A mirror head housing is attached to a vehicular body housing by a support shaft pivotally secured to each housing by a pivot assembly. Each pivot assembly includes two coacting journal bearing members with a frictional member therebetween to provide a constant biasing force continuously over the life of the assembly which resists rotation of the shaft with respect to the housings. In the preferred embodiment, one of the journal bearing members is a serpentine spring.

28 Claims, 7 Drawing Figures

VEHICULAR MIRROR ASSEMBLY AND PIVOT SUPPORT ASSEMBLY THEREFOR

BACKGROUND OF THE INVENTION (1) Field of the Invention

This invention relates generally to vehicular mirror assemblies supporting a mirror or the like and, more particularly, to an external vehicular mirror mounting which is biased to resist rotational or pivotal movement.

(2) Prior Art

Vehicular mirror assemblies including a pivotal coupling between a vehicle and a side view mirror are known and can include the use of a cantilever support between a structure mounted on the vehicle and a structure supporting the mirror. Certain prior mirror assemblies have provided adjustability of such a side view mirror between an inward and an outward position using threaded or other adjustable fasteners which are adjusted to resist a force applied to the mirror assembly tending to cause rotation. Thus, wind must not deflect the side view mirror from the desired position when the vehicle is in motion. Yet, because of safety standards in the United States, the mirror must be able to deflect out of the way when struck with a predetermined force accidentally or intentionally. Such deflection reduces the effective width of the vehicle. It is also desirable that the support for a side view mirror provide sufficient stability and low wind resistance so vibration does not blur the image seen in the mirror. Further, the support must allow a full range of adjustment positions for different drivers of a vehicle.

Apparatus to provide such a mounting can be relatively complex and relatively expensive to manufacture. Many prior known assemblies have used pivotal brackets mounted on the outside of a vehicle and exposed directly to water and salt. This has resulted in operational failure due to corrosion of the moving parts. Also, when adjustable fasteners are used, the mirror support may loosen undesirably because of transmitted road vibration and the failure of the adjustable fasteners either to properly maintain the tension of the pivot mounting or properly support the mirror to the vehicle. This causes unintentional deflection and/or misadjustment of the mirror, as well as severe, vision blurring vibration. Such misadjustment, blurring due to vibration, or other improper functioning due to corrosion and other factors can be a dangerous safety hazard.

SUMMARY OF THE INVENTION

Accordingly, the present invention provides a low-vibration, corrosion-resistant vehicular mirror assembly adapted for exterior use which overcomes the unintentional misadjustment problems mentioned above. The mirror assembly includes pivot support assemblies adapted for pivotally receiving a shaft extending between a mirror head housing and a support or body housing adapted for attachment to a vehicle.

Each pivot assembly includes a first and second coacting journal bearing member for supporting the shaft. At least one of the two journal bearing members applies a spring biasing force toward the shaft. One embodiment of the invention includes a friction means between the shaft and a journal bearing member for resisting the pivoting of the shaft with respect to the journal bearing members. Further, the journal bearing members can be coupled to each other by having one bearing member press against the other bearing member to apply a biasing force to the shaft, the friction means, and against a portion of the other bearing member. The two pivot support assemblies mounted on the shaft provide two orthogonally independent directions of pivoting for full adjustment of the mirror position when desired.

Each pivot support assembly applies a constant, non-adjustable biasing force within the assembly to provide a frictional resistance to rotational movement about the shaft. This force is maintained over the life of the assembly without maintenance attention or any adjustment. In effect, there is a constant torque resisting pivoting. The biasing force and the frictional means can be chosen so this torque is set high enough to resist deflection by wind due to vehicle movement. The constant biasing force also tends to compensate for wear between the journal bearing members, the friction means and the shaft, thus maintaining the constant torque resisting pivoting. Further, neither accidental or intentional attempts to adjust the biasing force, after assembly of the pivot support assembly, will change the torque required to rotate the assembly about the shaft. The structure, therefore, provides a relatively simple, foolproof pivotal support for a mirror or the like.

The pivot assembly is substantially enclosed within a housing, thus protecting the pivot support assembly from the environment and further ensuring the availability of a constant, predetermined torque resisting pivoting of the mirror even in the presence of a corrosive environment typical of that encountered by motor vehicles. In effect, the biasing force of the coacting journal bearing members can be pre-set at the place of manufacture, which is typically more desirable than setting or adjusting the biasing force in the field.

DETAILED DESCRIPTION OF THE INVENTION

Figure 1:
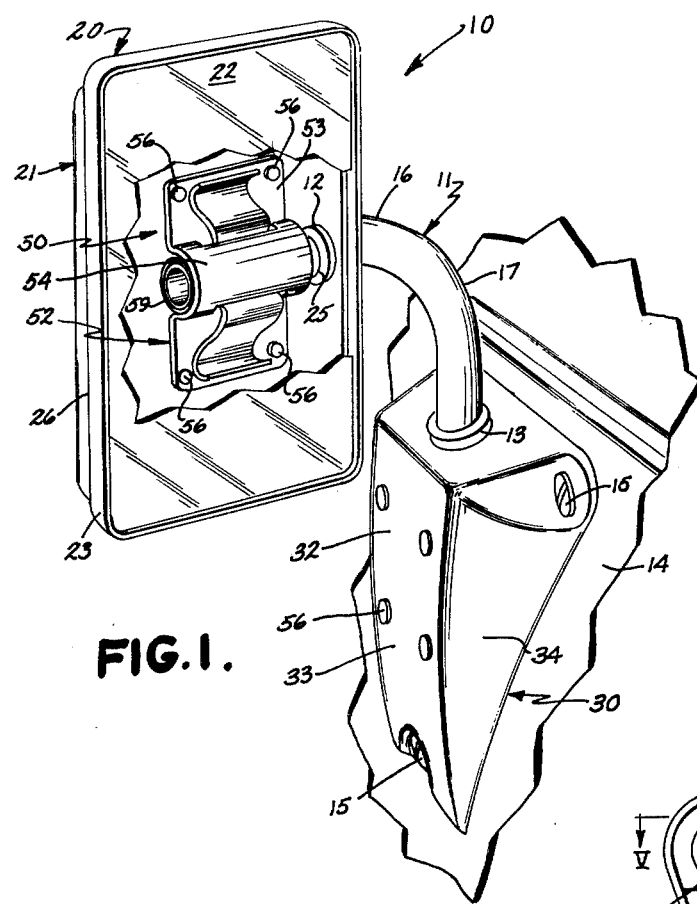
FIG. 1 is a perspective view, partly broken away, of a mirror assembly in accordance with an embodiment of this invention mounted on a vehicle door below the window of the vehicle door.

Referring to FIG. 1, a vehicular mirror assembly 10 includes a curved support arm or shaft 11 connecting a pivotal mirror head housing 20, mounted on one end of shaft 11, and a support or body housing 30 mounted on the other end of shaft 11. Support housing 30 is mounted on a vehicle 14 at a location such as the door below the window. Both mirror head housing 20 and support housing 30 include a pivot assembly 50 for coupling to shaft 11.

Figure 3:
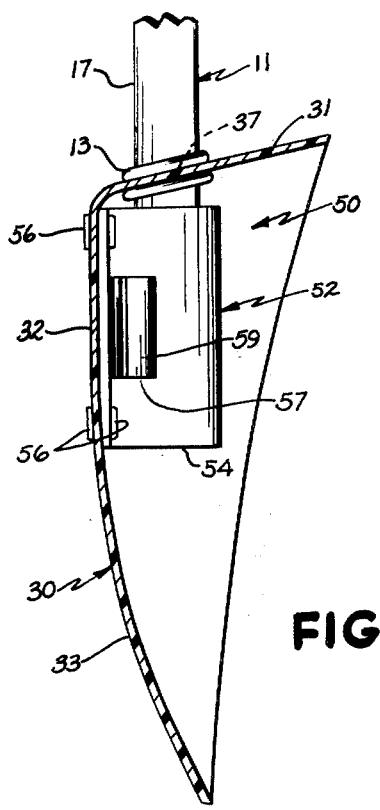
FIG. 3 is an enlarged sectional view taken generally along line III—III of FIG. 2.

Shaft 11 is an elongated tubular member having a curved 90° bend which divides shaft 11 into an upper leg 16 and a lower leg 17. Lower leg 17 extends generally vertically into an upper portion of support housing 30 and is pivotable about a vertical axis extending into support housing 30. Analagously, upper leg 16 extends generally horizontally into a side portion of mirror head housing 20. Mirror head housing 20 pivots about a horizontal axis coincident with the longitudinal axis of upper leg 16. A grommet 12 (FIG. 4) extends around an aperture 25 in side 26 of housing 20 at the junction of upper leg 16 and mirror head housing 20, and a grommet 13 (FIG. 3) extend around an aperture 37 in the top surface of housing 30 at the junction of support housing 30 and lower leg 17. Grommets 12 and 13 provide wear surfaces for the relative pivoting between shaft 11 and either mirror head housing 20 or support housing 30. They also seal out water, dirt and the like from the housing interiors. Advantageously, grommets 12 and 13 have sufficient lubricity so that they experience relatively little wear.

Figure 2:
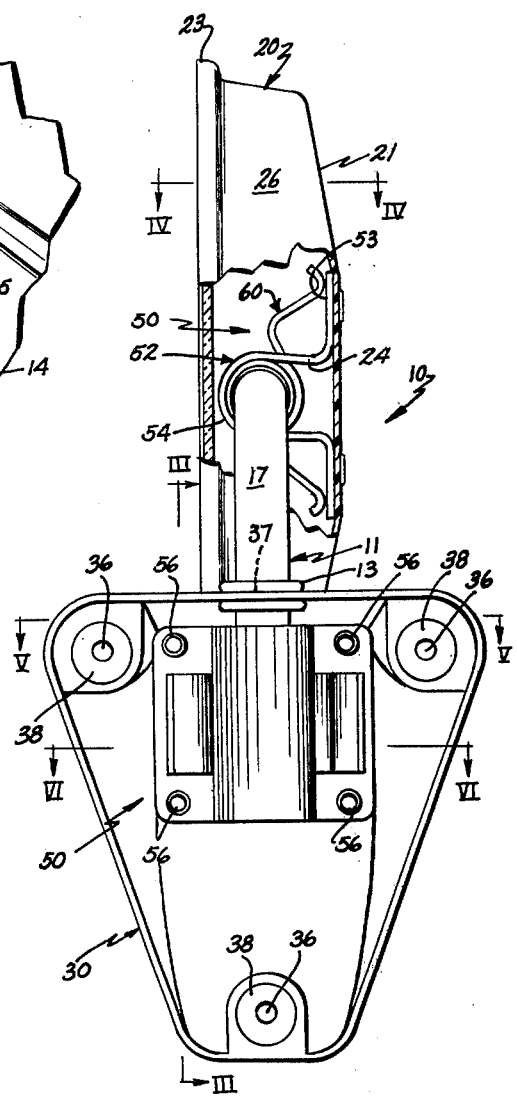
FIG. 2 is a side elevation view, partly broken away and sectional, of a mirror assembly in accordance with an embodiment of this invention.
Figure 4:
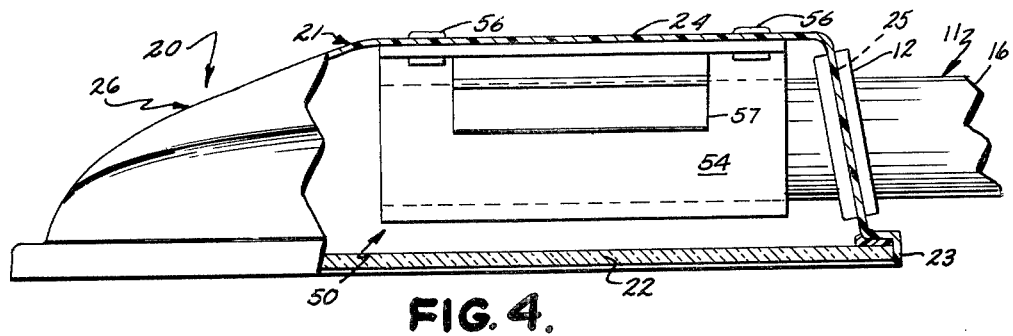
FIG. 4 is an enlarged sectional view taken generally along line IV—IV of FIG. 2.
Figure 5:
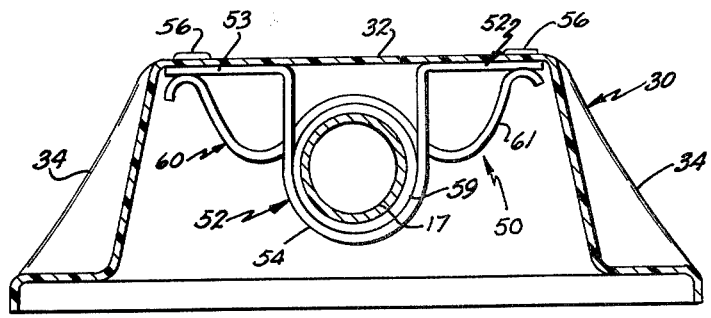
FIG. 5 is an enlarged sectional view taken generally along line V—V of FIG. 2.
Figure 6:
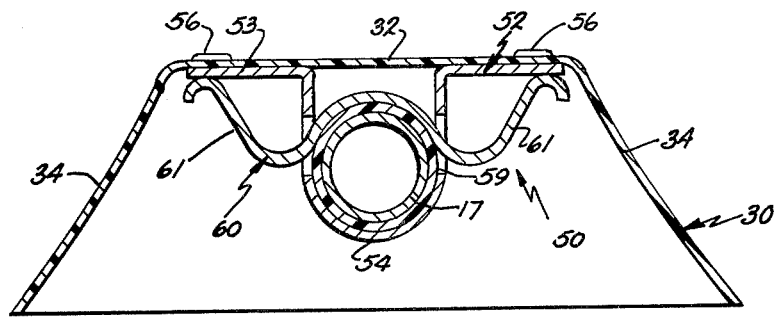
FIG. 6 is an enlarged sectional view taken generally along line VI—VI of FIG. 2.

Referring to FIGS. 1, 2 and 4, mirror head housing 20 includes a generally concave casing or shell 21 having a generally planar back wall portion 24 and generally planar sidewall portion 26 extending away from, and generally perpendicular to, back wall portion 24. As best seen in FIG. 4, back wall portion 24 and sidewall portion 26 do not join at a right angle but, instead, gently curve into one another thus reducing wind resistance and lowering vibration as well as facilitating molding of the shell 21. A ring portion 23 having an inwardly facing recess forms the outer edge of sidewall portion 26 and is used to secure a mirror 22. Mirror 22 is generally rectangular with rounded corners and shaped to fit within ring portion 23 which has a similar rectangular shape. A typical material for shell 21 is a molded plastic or stamped metal. Sidewall portion 26 includes a side opening 25 sufficiently large to receive grommet 12 and pass upper leg 16 into the interior of shell 21 behind mirror 22. A pivot assembly 50 is fixedly mounted with rivets or other permanent fasteners 56 on back wall portion 24 and pivotally connected to upper leg 16 protruding within shell 21.

Referring to FIGS. 2, 3, 5 and 6, support housing 30 has the general shape of a nonsymmetric, truncated hollow pyramid with a curved base edge adapted to fit snugly against the curvature of vehicle 14 where support housing 30 is to be mounted. Such curved edge may be changed to fit the particular shape of the desired vehicle. Mounting openings 36 extend through support housing 30 at three vertices. Reinforcing cylinders 38 surround openings 36 so support housing 30 can be tightly secured to vehicle 14. As shown in FIG. 1, screws 15 pass through each of mounting openings 36 into the body sheet metal of vehicle 14. When support housing 30 is mounted, an outwardly extending upper wall 31 has a top opening 37 therethrough for mounting grommet 13 and passing lower leg 17. Accordingly, top opening 37 is sized the same as side opening 25 of mirror head housing 20. Extending generally downward from the outward periphery of upper wall 31 is a center wall 32 which curves into a lower wall 33 extending further down and back towards vehicle 14. Extending down from each peripheral side of upper wall 31, between vehicle 14 and center and lower walls 32 and 33, are sidewalls 34. In some embodiments a reinforcing rib extends generally horizontally within support housing 30 between sidewalls 34 and lower wall 33. Generally, the reinforcing rib is an integral planar member and extends sufficiently out in a horizontal plane to make contact with vehicle 14. Another pivot assembly 50 is mounted on the interior of center wall 32 below the interior of top wall 31 and provides for pivotal coupling between support housing 30 and lower leg 17 of shaft 11. The curved, contoured shapes of housings 20, 30 also reduce wind resistance, and thus lower vibration, when they are mounted on a vehicle.

Both support housing 30 and mirror head housing 20 include an interiorly mounted pivot assembly 50. As already noted, in support housing 30 pivot assembly 50 is mounted on center wall 32 and in mirror head housing 20, pivot assembly 50 is mounted on back wall portion 24. In each case, pivot assembly 50 has a clamping aperture aligned to receive shaft 11 passing through top opening 37 in support housing 30 or side opening 25 in mirror head housing 20.

Each pivot assembly 50 includes a pair of coacting journal bearing members which partially define the clamping aperture within which shaft 11 is received. More particularly, a bracket 52 has a central U-shaped portion 54 and a pair of legs 53 extending generally perpendicularly outward from the extremities of U-shaped portion 54. Bracket 52 is sufficiently long in the dimension parallel to the longitudinal axis of shaft 11, to adequately support shaft 11 longitudinally. For example, a typical length is about two inches. Four rivets 56, at the four corners of bracket 52 extend through legs 53 and through the housing to couple pivot assembly 50 to the housing. A generally rectangular window 57 extends through a central portion of each of the sides of U-shaped portion 54.

Figure 7:
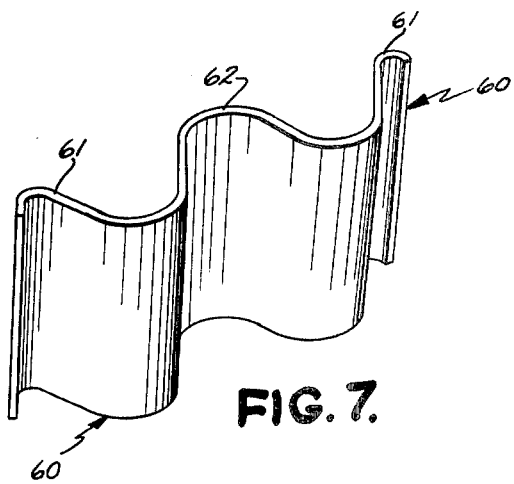
FIG. 7 is a perspective view of a spring journal bearing member for use in the pivot assembly of this invention.

The other of the pair of coacting bearing members of pivot assembly 50 is a spring 60 having a generally serpentine shape (FIG. 7) with a central curved cradle 62 and a leg 61 extending down from each of the extremities of cradle 62. Spring 60 is sufficiently narrow in width to fit through windows 57 of bracket 52 and sufficiently wide to support and apply the necessary biasing force to shaft 11. The outer extremities of legs 61 away from cradle 62 are curved and rest against legs 53. Thus legs 61 are on the other side of legs 53 from the housing to which bracket 52 is coupled. The curved ends decrease resistance to sliding of legs 61 when spring 60 is flexed and legs 61 move. A biasing force occurs when legs 61 resist bending as cradle 62 is retracted from U-shaped portion 54 to provide sufficient space to pass shaft 11. When spring 60 is positioned within bracket 52, crade 62 and U-shaped portion 54 define the clamping aperture aligned with top opening 37 in support housing 30 and side opening 25 in mirror head housing 20 for receiving shaft 11. As described, pivot assembly 50 is substantially sealed from the environment, one pivot assembly 50 being within mirror head housing 20 bounded by shell 21 and mirror 22 and another pivot assembly 50 being within support housing 30 bounded by walls 31, 32, 33 and 34 and vehicle 14.

A cylindrical hollow tubing 59 is placed on the portion of the shaft 11 to be received within the clamping aperture defined by bracket 52 and spring 60. Tubing 59 is made of a material such as plastic which has a sufficiently high coefficient of friction under pressure to provide a constant torque resisting relative pivoting between shaft 11 and pivot assembly 50. In the preferred embodiment, the tube 59 is formed from flexible black vinyl per ASTM D922 grade C and CFR. Further, the use of tubing 59 to provide a friction resisting turning of shaft 11 also provides damping of vibrations caused by vehicle 14 or the action of wind on mirror assembly 10. It also reduces wear between spring 60 and the interior surface of bracket 52. A typical wall thickness for tubing 59 is 1/16 inch.

To fabricate mirror assembly 10, support or body housing 30 and mirror head housing 20 are molded of a plastic material or stamped from sheet metal. Bracket 52 is an integral member stamped from a material such as steel and spring 60 is stamped and formed of a material such as spring steel. Spring 60 is inserted through windows 57 into bracket 52 and one pivot assembly 50 is coupled with rivets 56 onto center wall 32 of support housing 30 and another pivot assembly 50 is coupled onto back wall portion 24 of mirror head housing 20. A length of tubing 59, for example about two or three inches long, is positioned on each of lower leg 17 and upper leg 16. Lower leg 17 with surrounding tubing 59 is positioned within U-shaped portion 54 and cradle 62 of the pivot assembly 50 associated with support housing 30; and upper leg 16 with surrounding tubing 59 is positioned within U-shaped portion 54 and cradle 62 of the pivot assembly 50 associated with mirror head housing 20. The relative sizes of shaft 11 and pivot assembly 50 are such that a spring biasing force is applied by spring 60 against tubing 59 thereby applying a constant torque resisting pivoting of shaft 11 within pivot assembly 50. Pivot assembly 50 is particularly well suited for repeated pivotings because spring 60 takes up any slack due to the wearing of tubing 59. Further, any wear due to movement of shaft 11 causing the rubbing of legs 53 against legs 61 is well resisted because the steel surfaces are relatively resistant to wear and slide relatively easy over each other.

Mounting mirror assembly 10 on vehicle 14 requires passing screws 15 through mounting openings 36 in support housing 30. The adjustment of the biasing force of pivot assembly 50 is a result of the design of the assembly components and completed in the factory before mirror assembly 10 is mounted. Mirror assembly 10 is adjusted for proper rear viewing by pivoting mirror 22 about a horizontal axis coincident with upper leg 16 and a vertical axis coincident with lower leg 17.

Various modifications and variations will no doubt occur to those skilled in the art to which this invention pertains. For example, the particular shape of shaft 11, mirror head housing 20 and support housing 30 may be varied from that disclosed herein. These and all other variations which basically rely on the teachings through which this disclosure has advanced the art are properly considered within the spirit and broader aspects of this invention.

The embodiments of the invention in which an exclusive property or privilege is claimed are defined as follows:

1. A vehicular mirror assembly adapted for pivoting with respect to a shaft comprising:
   a housing having an access opening for receiving the shaft;
   a pivot support assembly for pivoting coupling the shaft to said housing;
   said pivot support assembly including a clamping aperture axially aligned with said access opening, a first and a second coacting journal bearing members at least partially defining said clamping aperture, said members acting on the shaft from opposite directions to clampingly support the shaft, and coupling means for connecting at least one of said first and second journal bearing members to said housing;
   said first journal bearing member being positioned around at least a portion of the circumference of the shaft and having at least one opening therethrough for admitting said second journal bearing member to apply a clamping pressure on the shaft; said second journal bearing member extending through said opening in said first journal bearing member and interengaged therewith, resting against a portion of said first journal bearing and including a spring means for applying a force between said second journal bearing and the shaft and against a portion of said first journal bearing member; the interengagement of said first and second journal bearing members being adapted to confine the shaft therebetween and, together with said spring means, resist rotation of the shaft independently of said coupling means; and
   said housing at least partially enshrouding said pivot support assembly thereby providing a weather barrier for said assembly.

2. A vehicular mirror assembly as recited in claim 1 further comprising a friction means for providing a desired force to resist pivoting of the shaft, said friction means positioned between the shaft and at least one of said journal bearing members, and said friction means having a coefficient of friction sufficently high to provide the desired force resisting pivoting of the shaft.

3. A vehicular mirror assembly as recited in claim 2 wherein said friction means has a generally tube-shaped portion with a central opening sized to receive the shaft and said friction means contacts both said first and second journal bearing members.

4. A vehicular mirror assembly as recited in claim 3 wherein said first journal bearing member has a generally U-shaped portion which at least partially defines a clamping aperture for receiving said friction means and the shaft, said first journal bearing member has a pair of side openings and a first pair of legs extending outwardly from said U-shaped portion, said second journal bearing member passes through said pair of side openings and partially defines said clamping aperture and rests against said first pair of legs thereby applying a biasing force from said second journal bearing member to said friction means and the shaft.

5. A vehicular mirror assembly adapted for pivoting with respect to a shaft comprising;
   a housing having an access opening for receiving the shaft;
   a pivot support assembly for pivotally coupling the shaft to said housing;
   said pivot support assembly including a clamping aperture axially aligned with said access opening, a first and a second coacting journal bearing members at least partially defining said clamping aperture, said members acting on the shaft from opposite directions to clampingly support the shaft; said first journal bearing member being positioned around at least a portion of the circumference of the shaft and having at least one opening therethrough for admitting said second journal bearng member to apply a clamping pressure on the shaft; said second journal bearing resting against a portion of said first journal bearing and including a spring means for applying a force between said second journal bearing and the shaft and against a portion of said first journal bearing member; and said pivot support assembly including coupling means for connecting said first journal bearing member to said housing;

said housing at least partially enshrouding said pivot support assembly thereby providing a weather barrier for said assembly;

a friction means for providing a desired force to resist pivoting of the shaft, said friction means positioned between the shaft and at least one of said journal bearing members, said friction means having a coefficient of friction sufficiently high to provide the desired force resisting pivoting of the shaft, a generally tube-shaped portion with a central opening sized to receive the shaft, and contacting both said first and second journal bearing members;

said first journal bearing member having a generally U-shaped portion which at least partially defines said clamping aperture for receiving said friction means and the shaft, a pair of side openings, and a first pair of legs extending outwardly from said U-shaped portion;

said second journal bearing member passing through said pair of side openings, partially defining said clamping aperture, and resting against said first pair of legs thereby applying a biasing force from said second journal bearing member to said friction means and the shaft; said second journal member having a generally serpentine shape with a central curved cradle facing said friction means and a second pair of legs, one of said second pair of legs extending from each side of said cradle and engaging said first journal bearing member.

6. A vehicular mirror assembly adapted for pivoting with respect to a shaft comprising:

a housing having an access opening for receiving the shaft;

a pivot support assembly secured within said housing and pivotally coupling the shaft to said housing;

said pivot support assembly including a clamping aperture with a longitudinal axis, said clamping aperture axially aligned with said access opening, a first and a second coacting journal bearing members for supporting the shaft and at least partially defining said clamping aperture, and coupling means for connecting at least one of said first and second journal bearing members to said housing; at least one of said first and second journal bearing members including a spring means for applying a spring biasing force toward the shaft; a friction means for resisting the pivoting of the shaft with respect to said first and second journal bearing members, said friction means coupled between the shaft and at least one of said first and second journal bearing members; said first and second journal bearing members being interengaged with one another and adapted to confine the shaft therebetween such that, together with said spring means and friction means, they resist rotation of the shaft independently of said coupling means;

said housing at least partially enshrouding said pivot support assembly thereby providing a weather barrier for said pivot support assembly.

7. A vehicular mirror assembly as recited in claim 6 wherein said friction means is a tube surrounding the shaft and subjected to a compressive force between the shaft and said journal bearing members, said tube being made of a material having a coefficient of friction sufficiently high to provide a force resisting pivoting of the shaft.

8. A vehicular mirror assembly adapted for pivoting with respect to a shaft comprising:

a housing having an access opening for receiving the shaft;

a pivot support assembly secured within said housing for pivotally coupling the shaft to said housing;

said pivot support assembly including a clamping aperture with a longitudinal axis, said clamping aperture axially aligned with said access opening, a first and a second coacting journal bearing members for supporting the shaft and at least partially defining said clamping aperture; at least one of said first and second journal bearing members including a spring means for applying a spring biasing force toward the shaft; a friction means for resisting the pivoting of the shaft with respect to said first and second journal bearing members, said friction means coupled between the shaft and at least one of said first and second journal bearing members; and said pivot support assembly including coupling means for connecting said first journal bearing member to said housing;

said housing at least partially enshrouding said pivot support assembly thereby providing a weather barrier for said pivot support assembly;

said friction means including a tube surrounding the shaft and subjected to a compressive force between the shaft and said journal bearing members, said tube being made of a material having a coefficient of friction sufficiently high to provide a force resisting pivoting of the shaft;

said first journal bearing member having a generally U-shaped portion which at least partially defines said clamping aperture for receiving said friction means and the shaft, a pair of side openings through said U-shaped portion, and a first pair of legs extending outwardly from said U-shaped portion;

said second journal bearing member passing through said pair of side openings and partially defining said clamping aperture, resting against said first pair of legs thereby applying a biasing force from said second journal bearing member to said firction means and the shaft and having a generally serpentine shape with a central curved cradle having a concave portion facing said friction means and a second pair of legs, one of said second pair of legs extending from each side of said cradle and engaging said first journal bearing member.

9. A vehicular mirror assembly recited in claim 8 wherein said coupling means includes rivets extending through said first pair of legs and said housing for coupling said pivot support assembly to said housing.

10. A vehicular mirror assembly comprising:

an elongated shaft;

a first support housing having a first access opening for receiving said shaft;

a second support housing having a second access opening for receiving said shaft, said second support housing being spaced from said first support housing;

a first pivot support assembly pivotally coupling said shaft to said first support housing and including first coupling means for rigidly connecting said first pivot support assembly to said first support housing;

a second pivot support assembly pivotally coupling said shaft to said second support housing and including second coupling means for rigidly connecting said second pivot support assembly to said second support housing; and said first and second pivot support assemblies each including a clamping aperture axially aligned with one of said first and second access openings and a first and a second coacting journal bearing members at least partially defining said clamping aperture, said members acting on the shaft from opposite directions to clampingly support the shaft; said first journal bearing member being positioned around at least a portion of the circumference of the shaft and having at least one opening therethrough for admitting said second journal bearing member to apply a clamping pressure on the shaft; and said second journal bearing member extending through said opening in said first journal bearing member and interengaged therewith, resting against a portion of said first journal bearing and including a spring means for applying a force between said first journal bearing member and the shaft; the interengagement of said first and second journal bearing members being adapted to confine the shaft therebetween and, together with said spring means, resist rotation of the shaft independently of said coupling means.

11. A vehicular mirror assembly as recited in claim 10 wherein each of said first and second pivot support assemblies further comprise a friction means for applying a force to resist pivoting of the shaft, said friction means positioned between the shaft and at least one of said journal bearing members, and said friction means having a coefficient of friction sufficiently high to provide the force resisting pivoting of the shaft.

12. A vehicular mirror assembly comprising:
an elongated shaft;
a first support housing having a first access opening for receiving said shaft;
a second support housing having a second access opening for receiving said shaft, said second support housing being spaced from said first support housing;
a first pivot support assembly pivotally coupling said shaft to said first support housing and including first coupling means for rigidly connecting said first pivot support assembly to said first support housing;
a second pivot support assembly pivotally coupling said shaft to said second support housing and including second coupling means for rigidly connecting said second pivot support assembly to said second support housing; and
said first and second pivot support assemblies each including a clamping aperture axially aligned with one of said first and second access openings and a first and a second coacting journal bearing members at least partially defining said clamping aperture, said members acting on the shaft from opposite directions to clampingly support the shaft; said first journal bearing member being positioned around at least a portion of the circumference of the shaft and having at least one opening therethrough for admitting said second journal bearing member to apply a clamping pressure on the shaft; and said second journal bearing member resting against a portion of said first journal bearing and including a spring means for applying a force between said second journal bearing member and the shaft;

each of said first and second pivot support assemblies further including a friction means for applying a force to resist pivoting of the shaft, said friction means positioned between the shaft and at least one of said journal bearing members, and having a coefficient of friction sufficiently high to provide the force resisting pivoting of the shaft;

said first journal bearing member in each of said first and second pivot support assemblies having a generally U-shaped portion which at least partially defines said clamping aperture for receiving said friction means and the shaft, a pair of side openings therethrough, and a first pair of legs extending outwardly from said U-shaped portion;

said second journal bearing member passing through said pair of side openings, partially defining said clamping aperture, and resting against said first pair of legs thereby applying a biasing force from said second journal bearing member to said friction means and the shaft; and said second journal bearing member having a generally serpentine shape with a central curved cradle facing said friction means and a second pair of legs, one of said second pair of legs extending from each side of said cradle and engaging said first journal bearing member.

13. A vehicular mirror assembly as recited in claim 12 wherein:
said shaft includes a first leg portion and a second leg portion, said first and second leg portions being at an angle to one another, said first leg portion being coupled to said first support housing and said second leg portion being coupled to said second support housing:
said first support housing includes a mirror and a shell for supporting said mirror;
said second support housing includes means for mounting said support assembly to a vehicle; and
said first and second coupling means includes rivets extending through said first pivot assembly and said first support housing and extending through said second pivot assembly and said second support housing.

14. A pivot support assembly adapted for receiving and supporting a shaft to allow rotation of the shaft upon application of a predetermined rotational force comprising:
a first and a second coacting journal bearing members, said members interengaging one another and adapted to act on the shaft from opposite directions to confine and clampingly support the shaft therebetween; said first journal bearing member being positioned around at least a portion of the circumference of the shaft and having at least one opening therethrough for admitting said second journal bearing member to apply a clamping pressure on the shaft; said second journal bearing member extending through said opening in said first journal bearing member and interengaged therewith, resting against a portion of said first journal bearing and including a spring means for applying a force between said second journal bearing and the shaft and against a portion of the first journal bearing member; securing means for securing at least one of said journal bearing members to another support; said journal bearing members, together with said spring means, adapted to resist rotation of the shaft independently of said securing means.

15. A pivot support assembly as recited in claim 14 further comprising a friction means for resisting with a desired force the pivoting of the shaft, said friction means positioned between the shaft and at least one of said journal bearing members and said friction means having a coefficient of friction sufficiently high to provide the desired force resisting pivoting of the shaft.

16. A pivot support assembly as recited in claim 15 wherein said friction means has a generally tube-shaped portion with a central opening sized to receive the shaft and said friction means contacts both said first and second journal bearing members.

17. A pivot support assembly adapted for receiving and supporting a shaft to allow rotation of the shaft upon application of a predetermined rotational force comprising:
a first and a second coacting journal bearing members, said members acting on the shaft from opposite directions to clampingly support the shaft; said first journal bearing member being positioned around at least a portion of the circumference of the shaft and having at least one opening therethrough for admitting said second journal bearing member to apply a clamping pressure on the shaft; said second journal bearing resting against a portion of said first journal bearing and including a spring means for applying a force between said second journal bearing and the shaft and against a portion of the first journal bearing member;
a friction means for resisting with a desired force the pivoting of the shaft, said friction means positioned between the shaft and at least one of said journal bearing members, having a coefficient of friction sufficiently high to provide the desired force resisting pivoting of the shaft, and having a generally tube-shaped portion with a central opening sized to receive the shaft, said friction means contacting both said first and second journal bearing members;
said first journal bearing member having a generally U-shaped portion which at least partially defines a clamping aperture for receiving said friction means and the shaft, a pair of side openings through said U-shaped portion, and a first pair of legs extending outwardly from said U-shaped portion;
said second journal bearing member passing through said pair of side openings and partially defining said clamping aperture and resting against said first pair of legs thereby applying a biasing force from said second journal bearing member to said friction means and the shaft.

18. A pivot support assembly as recited in claim 17 wherein said second journal member has a generally serpentine shape with a central curved cradle facing said friction means and a second pair of legs, one of said second pair of legs extending from each side of said cradle and engaging said first journal bearing member.

19. A pivot support assembly as recited in claim 18 wherein said first pair of legs is generally planar and extend generally outwardly from the extremities of said U-shaped portion and said second pair of legs of said second journal bearing member engage said first journal bearing member at a position spaced from said U-shaped portion.

20. A pivot support assembly as recited in claim 19 further including:
a housing for at least partially encasing said pivot support assembly; and
rivets extending through said first pair of legs for coupling said pivot support assembly to said housing.

21. A pivot support assembly as recited in claim 20 wherein said friction means is fabricated of a plastic material, said first journal bearing is a metallic material and said second journal bearing is a spring metallic material.

22. A pivot support assembly adapted for receiving and supporting a shaft to allow rotation of the shaft upon application of a predetermined rotational force comprising:
a first and a second coacting journal bearing members for supporting the shaft; at least one of said first and second journal bearing members applying a spring biasing force toward the shaft and at least a portion of the other of said other journal bearing members; and a friction means for providing a desired force to resist the pivoting of the shaft with respect to said first and second journal bearing members, said friction means coupled between and engaging the shaft and at least one of said first and second journal bearing members; securing means for securing at least one of said journal bearing members to another support; said journal bearing members interengaging one another and adapted to confine the shaft therebetween and, together with the spring force and said friction means, resist rotation of the shaft independently of said securing means.

23. A pivot support assembly as recited in claim 22 wherein said friction means is a tube surrounding the shaft and subjected to a compressive force between the shaft and said journal bearing members, said tube being of a material having a coefficient of friction sufficiently high to provide the desired force resisting pivoting of the shaft with respect to said first and second journal bearing members.

24. A pivot assembly as recited in claim 23 wherein said first journal bearing member has a generally U-shaped portion which at least partially defines a clamping aperture for receiving said friction means and the shaft, said first journal bearing member has a pair of side openings and a first pair of legs extending outwardly from said U-shaped portion, said second journal bearing member passes through said pair of side openings, partially defines said clamping aperture, and rests against said first pair of legs thereby applying a biasing force from said second journal bearing member to said friction means and the shaft.

25. A pivot support assembly adapted for receiving and supporting a shaft to allow rotation of the shaft upon application of a predetermined rotational force comprising:
a first and a second coacting journal bearing members for supporting the shaft; at least one of said first and second journal bearing members applying a spring biasing force toward the shaft; and a friction means for providing a desired force to resist the pivoting of the shaft with respect to said first and second journal bearing members, said friction means coupled between and engaging the shaft and at least one of said first and second journal bearing members;
said friction means including a tube surrounding the shaft and subjected to a compressive force between the shaft and said journal bearing members, said tube being of a material having a coefficient of friction sufficiently high to provide the desired force resisting pivoting of the shaft with respect to said first and second journal bearing members;

said first journal bearing member having a generally U-shaped portion which at least partially defines a clamping aperture for receiving said friction means and the shaft, a pair of side openings, and a first pair of legs extending outwardly from said U-shaped portion;

said second journal bearing member passing through said pair of side openings, partially defining said clamping aperture, and resting against said first pair of legs thereby applying a biasing force from said second journal bearing member to said friction means and the shaft; said second journal member having a generally serpentine shape with a central curved cradle with a generally concave surface facing said friction means and a second pair of legs, one of said second pair of legs extending from each side of said cradle and engaging said first journal bearing member.

26. A pivot support assembly as recited in claim 25 wherein said first pair of legs is generally planar and extends generally outwardly from the extremities of said U-shaped portion and said second pair of legs of said second journal bearing member engage said first journal bearing member at a position spaced from said U-shaped portion.

27. A pivot support assembly as recited in claim 26 further including:
- a housing for at least partially encasing said pivot support assembly; and
- rivets extending through said first pair of legs for coupling said pivot support assembly to said housing.

28. A pivot support assembly as recited in claim 27 wherein said friction means is fabricated of a plastic material, said first journal bearing is a metallic material and said second journal bearing is a spring metallic material.

* * * * *

UNITED STATES PATENT AND TRADEMARK OFFICE
CERTIFICATE OF CORRECTION

PATENT NO. : 4,166,651
DATED : September 4, 1979
INVENTOR(S) : Wayne Vandenbrink et al.

It is certified that error appears in the above-identified patent and that said Letters Patent are hereby corrected as shown below:

Column 5, line 58:
"pivoting" should be --pivotally--

Column 6, line 61:
"bearng" should be --bearing--

Column 7, line 58:
insert --and-- after ";"

Signed and Sealed this

Twenty-fifth Day of March 1980

[SEAL]

Attest:

SIDNEY A. DIAMOND

Attesting Officer

Commissioner of Patents and Trademarks